United States Patent [19]

Hawkins et al.

[11] Patent Number: 4,792,133

[45] Date of Patent: Dec. 20, 1988

[54] SUBSTITUTE GROUND SURFACE MATERIAL

[75] Inventors: Paul Hawkins, Leicester; John D. Dachtler, Isle of Wight, both of England

[73] Assignee: En-tout-cas plc, Syston, England

[21] Appl. No.: 939,540

[22] Filed: Dec. 8, 1986

[30] Foreign Application Priority Data

Jan. 14, 1986 [GB] United Kingdom ............... 8600735

[51] Int. Cl.$^4$ ............ A63J 3/00; A63K 1/00; C09K 3/18
[52] U.S. Cl. ............................. 272/3; 272/5; 428/403; 428/404; 428/407; 252/88; 106/229; 106/83; 106/84
[58] Field of Search ........... 427/215, 220, 221, 138; 428/403, 404, 407, 443; 252/88; 272/56.5 SS, 3, 4, 5; 106/229, 901, 83, 84

[56] References Cited

U.S. PATENT DOCUMENTS

| | | | |
|---|---|---|---|
| 1,600,515 | 9/1926 | Secoy | 252/88 |
| 3,533,953 | 10/1970 | Mills et al. | 252/88 |
| 4,452,926 | 6/1984 | Matsushima et al. | 428/407 |
| 4,598,019 | 7/1986 | Yokoyama | 428/407 |

FOREIGN PATENT DOCUMENTS

| | | | |
|---|---|---|---|
| 0745046 | 10/1966 | Canada | 272/56.5 SS |
| 2359935 | 7/1976 | France | 272/3 |
| 0200476 | 5/1983 | German Democratic Rep. | 272/03 |
| 0074723 | 7/1978 | Japan | 272/3 |

OTHER PUBLICATIONS

Grant, J. *Hackh's Chem. Dictionary,* (McGraw-Hill, NY), p. 488.
Webster's Seventh New Collegiate Dictionary, (G & C Meariam Co., Springfield), c. 1967, p. 829.
Webster's Ninth New Collegiate Dictionary (G & C Merriam Co., Springfield), c. 1983, pp. 69, 676, 764.

*Primary Examiner*—Norman Morgenstern
*Assistant Examiner*—Margaret Burke
*Attorney, Agent, or Firm*—spensley Horn Jubas & Lubitz

[57] ABSTRACT

The invention relates to a substitute soil material for laying as a sports surface for example a horse-race track. The material may be a sand or other fine granular material with a binder comprising a polymeric material dispersed or dissolved in an oil which preferably is a soft grease at ordinary climatic temperatures. When laid, the surface may be maintained by periodic raking. Suitable polymeric materials are e.v.a. polystyrene, nylon or p.v.c.

9 Claims, No Drawings

SUBSTITUTE GROUND SURFACE MATERIAL

The invention relates to ground surfaces and substitute soil material for use in forming the same. More particularly but not exclusively, it relates to treated particulate material adapted to be laid in defined areas so as to form recreational ground surfaces.

Recreational ground surfaces should ideally be little affected by weather or by wear and should offer a durable, resilient superstrate having consistent properties throughout its area. Where such ground surfaces, for example a horse rack track, comprises turf the turf may become slippery when wet, hard and crumbly in drought conditions and unsuitable for use at all in icy conditions or during and after heavy rainfall. Inconsistencies arise in the properties of the track due to the formation of divots thrown up by hooves, uneven treatment by rollers, differences in soil types or various densities of the subsoil beneath the turf.

Alternatively, race tracks or other recreational surfaces may be of the kind known as dirt-tracks comprising sand bound by clay compost or other binder, but such surfaces are adversely affected by rain, very dirty in use and require considerable maintenance. In attempts to improve the resilience characteristics of track, it may for example be decided to incorporate wood chippings which will be found quickly to deteriorate in use and eventually to rot.

It is well known that tracks of the various kinds mentioned above exhibit very different characteristics in wet conditions. Hard dry surfaces may cause injury to the joints and muscles of the users, for example horses or dogs, due to jarring deceleration on impact. Moreover, dry conditions often result in the formation of so-called dust-bowl conditions, which have a debilitating effect on horses by causing equine cough. Wet, soft surfaces are tiring to the animal and make the performance of the track, i.e. the "going", slow.

It is an object of the invention to provide a soil or ground substitute. It is a further object to provide a soil or ground substitute the use of which minimizes the above disadvantages.

The invention provides, in accordance with one of its several aspects, substitute soil material comprising sand or the like particulate or granular mineral material treated with a binder comprising synthetic polymeric material dispersed or dissolved in an oil or similar compound selected from the group consisting of latices, alginates, molasses and combinations thereof, said oil or similar compound having a viscosity such that it is substantially non-fluid at ambient temperatures so as to produce an inert, discrete material permanently capable of being racked when laid in a layer upon a substrate.

The invention further provides, in accordance with another aspect, a recreational or sports area having a surface formed of said substitute soil material.

The invention further provides, in accordance with yet another aspect, a horse race track having a surface formed of said substitute soil material.

Advantageously, the particulate material may be of varying particle size. The oil or similar compound will conveniently have the consistency of a soft grease at normal temperatures and will become fluid at temperatures in a range immediately above climatic temperatures appropriate to the location of use. Suitable oils may be petroleum-based or may be selected from other oils including organic oils.

The polymeric material may be ethylene vinyl acetate (E.V.A.), polystyrene, nylon, polypropylene, polyvinyl chloride and the like, as selected, and itself may conveniently be added to the oil or similar compound in particulate form to facilitate dissolution.

Selected oils or similar compound will also be of a kind for which there is a reasonably wide margin of safety between the melting point of the polymeric material and the temperature at which heat degradation commences.

It will be appreciated that the addition of the polymeric material to the oil or similar compound imparts an appreciable degree of resilience to the treated sand. This resilience is such that for example a horse's hoof landing on the surface of a horse race track formed of material according to the invention deforms the surface to a limited extent i.e. causes a limited shear movement. This allows the hoof to pivot in the track surface as the animal moves forward. However if the binder were not present, the sand would move too freely to assist the next stage of the horse's movement, that is, the pushing back of the hoof against the track for the next stride. Sand alone does not provide a firm enough reaction surface. However, a track formed of substitute soil material according to the present invention not only possesses the desired limited shear action but also the firm reaction surface to assist the horse's next stride.

The track also has a limited capability for retaining air between the treated particles. This entrainment of air contributes to the comfortable under-foot conditions produced by the resilience of the binder in the construction of the track produced according to the invention. Additional resilience may be obtained by the addition of particles of cork or synthetic or natural rubber to the treated sand.

There will now be described an example of a material according to the invention. It will be understood that the description is given by way of example only and not by way of limitation.

EXAMPLE

In the example a batch of sand of varying particle size was treated. The range of particle sizes corresponds to the as-dug condition of the sand. However, the sand was dried before treatment.

A petroleum oil fraction having a consistency approximating to a soft grease at ambient temperatures (c. 1000 centipoise at 20° C.) was heated to 160° C. Ethylene vinyl acetate (e.v.a.) containing approximately 28% vinyl acetate and having a melt flow index of 25 was then added in particulate form to the heated oil in a ratio of 1 part e.v.a. to 9 parts oil by weight and caused to dissolve by a stirring operation. The dry sand was then added to the binder in the ratio of 100 parts sand to 6.5 parts binder and thoroughly mixed.

The resulting mixture was laid to a depth of 15–20 cm as a superstrate over subsoil or a suitable porous graded stone base and was found to give agreeable "going" characteristics for a horse. As an alternative the mixture may be laid on a membrane comprising a so-called geotextile, a non woven textile designed to reduce migration of particles between layers.

Maintenance of the track has been found to be easy, comprising simply raking or turning over the top 5 to 8 cm. Light rolling will be found to compact a thin upper layer of say 1–2 cm which acts to resist the entry of rainwater. If however, rain seeped into the track superstrate, and was unable to drain through the substrate it will be found to be readily expelled by firm rolling, whereupon the water will run off the surface if a suitable slight fall or camber is provided. Advantageously the substrate may be porous to minimise drainage problems. When the track is not in use it may be firmly rolled to become waterproof.

As other examples, the oil or similar compound may be selected from bitumen or gas oil, siliconised oil, suitable latices, alginates or molasses with suitable polymers selected from for example polystyrene, nylon, polypropylene and polyvinyl chloride (p.v.c.). Laid surfaces or tracks according to the invention may be coloured as desired by the addition of pigments during the mixing stage.

Superstrates formed according to the invention produce a marked degree of springiness to the laid area or track.

We claim:

1. Substitute ground surface material comprising sand or other particulate or granular mineral material treated with a binder comprising synthetic polymeric material dispersed or dissolved in a compound selected from the group consisting of latices, alginates, molasses and combinations thereof, said compound having a viscosity such that it is substantially non-fluid at ambient temperatures so as to produce an inert, discrete material permanently capable of being raked when laid in a layer upon a substrate.

2. Ground surface material as claimed in claim 1 wherein the sand or other particulate or granular material is of varying particle size.

3. Substitute ground surface material comprising sand or other particulate or granular mineral material treated with a binder comprising synthetic polymeric material dispersed or dissolved in an oil, said oil having a viscosity such that it is substantially non-fluid at ambient temperatures so as to produce an inert, discrete material permanently capable of being raked when laid in a layer upon a substrate, wherein said oil is a bitumen or gas oil.

4. Substitute ground surface material comprising sand or other particulate or granular mineral material treated with a binder comprising synthetic polymeric material dispersed or dissolved in an oil, said oil having a viscosity such that it is substantially non-fuild at ambient temperatures so as to produce an inert, discrete material permanently capable of being raked when laid in a layer upon a substrate wherein said oil is a siliconized oil.

5. Substitute ground surface material comprising sand or other particulate or granular mineral material treated with a binder comprising synthetic polymeric material dispersed or dissolved in an oil, said oil having a viscosity such that it is substantially non-fluid at ambient temperatures so as to produce an inert, discrete material permanently capable of being raked when laid in a layer upon a substrate, wherein said polymeric material is ethylene vinyl acetate.

6. Ground surface material as claimed in claim 5 wherein said ethylene vinyl acetate contains approximately 28% vinyl acetate by weight.

7. Substitute ground surface material comprising sand or other particulate or granular mineral material treated with a binder comprising synthetic polymeric material dispersed or dissolved in an oil, said oil having a viscosity such that it is substantially non-fluid at ambient temperatures so as to produce an inert, discrete material permanently capable of being raked when laid in a layer upon a substrate wherein said polymeric material is polyvinyl chloride.

8. Substitute ground surface material comprising sand or other particulate or granular mineral material treated with a binder comprising synthetic polymeric material dispersed or dissolved in an oil, said oil having a viscosity such that it is substantially non-fluid at ambient temperatures so as to produce an inert, discrete material permanently capable of beng raked when laid in a layer upon a substrate wherein coloring pigments are added to said ground surface material.

9. A recreational or sports area having a surface formed of a substitute ground surface material comprising sand or other particulate or granular mineral material treated with a binder comprising synthetic polymeric material selected from the group consisting of ethylene vinyl acetate, polystyrene, nylon, polypropylene and polyvinyl chloride, dispersed or dissolved in an oil or similar compound selected from the group consisting of latices, alginates, molasses and combinations thereof, said oil or similar compound having a viscosity such that it is substantially non-fluid at ambient temperatures so as to produce an inert, discrete material permanently capable of being raked when laid in a layer upon a substrate, wherein said material is laid in a layer upon a substrate.

* * * * *